United States Patent
Straub et al.

(10) Patent No.: US 10,104,412 B2
(45) Date of Patent: Oct. 16, 2018

(54) METHOD FOR SELECTING FROM A PLURALITY OF CANDIDATE VIDEO FRAME SETS, A CANDIDATE VIDEO FRAME SET TO BE INSERTED IN A VIDEO FRAME SLOT OF A GIVEN VIDEO CONTENT, CORRESPONDING DEVICE, ARRANGEMENT AND COMPUTER PROGRAM PRODUCT

(71) Applicant: THOMSON LICENSING, Issy les Moulineaux (FR)

(72) Inventors: Gilles Straub, Acigne (FR); Christoph Neumann, Rennes (FR); Nicolas Le Scouarnec, Liffre (FR)

(73) Assignee: Thomson Licensing, Issy-les-Moulineaux (FR)

( * ) Notice: Subject to any disclaimer, the term of this patent is extended or adjusted under 35 U.S.C. 154(b) by 0 days.

(21) Appl. No.: 14/922,090

(22) Filed: Oct. 23, 2015

(65) Prior Publication Data

US 2016/0119664 A1    Apr. 28, 2016

(30) Foreign Application Priority Data

Oct. 23, 2014    (EP) .................................... 14306688

(51) Int. Cl.
*H04N 7/10*    (2006.01)
*H04N 7/025*    (2006.01)
(Continued)

(52) U.S. Cl.
CPC ....... *H04N 21/25891* (2013.01); *G11B 27/10* (2013.01); *H04N 21/2183* (2013.01);
(Continued)

(58) Field of Classification Search
CPC .......... H04N 21/2183; H04N 21/2668; H04N 21/812; H04N 21/42653
See application file for complete search history.

(56) References Cited

U.S. PATENT DOCUMENTS

2002/0116251 A1*  8/2002  Chen ................. G06Q 30/0283
                                                        705/400
2003/0188308 A1   10/2003  Kizuka
(Continued)

FOREIGN PATENT DOCUMENTS

EP    2765781    8/2014
EP    2830288    1/2015
(Continued)

OTHER PUBLICATIONS

Maille et al "Sponsored Search Auctions: An Overview of Research with emphasis on Game Theoretic Aspects" Jul. 26, 2011; pp. 1-34.
(Continued)

*Primary Examiner* — Kunal Langhnoja
(74) *Attorney, Agent, or Firm* — Myers Wolin LLC

(57) ABSTRACT

A method and a related electronic device for selecting, from a plurality of candidate video frame sets, a candidate video frame set to be inserted in a video frame slot of a given video content. It comprises obtaining the plurality of candidate video frame sets according to ranking values of a sorting parameter associated with each of the candidate video frame sets, thereby obtaining a list of candidate video frame sets and for each candidate video frame set of the list, determining a processing cost for inserting the candidate video frame set and applying the processing cost for obtaining an updated candidate video frame set ranking value according to the sorting parameter. The list is then sorted according to the updated ranking values of the sorting parameter and a
(Continued)

selection of a candidate video frame set of the sorted list according to the updated ranking value.

7 Claims, 1 Drawing Sheet

(51) Int. Cl.
| | | |
|---|---|---|
| H04N 21/258 | (2011.01) | |
| H04N 21/234 | (2011.01) | |
| H04N 21/262 | (2011.01) | |
| H04N 21/2668 | (2011.01) | |
| H04N 21/44 | (2011.01) | |
| H04N 21/81 | (2011.01) | |
| G11B 27/10 | (2006.01) | |
| H04N 21/2183 | (2011.01) | |
| H04N 21/845 | (2011.01) | |

(52) U.S. Cl.
CPC ... *H04N 21/23424* (2013.01); *H04N 21/2668* (2013.01); *H04N 21/26225* (2013.01); *H04N 21/26258* (2013.01); *H04N 21/44016* (2013.01); *H04N 21/812* (2013.01); *H04N 21/8456* (2013.01)

(56) References Cited

U.S. PATENT DOCUMENTS

| | | | |
|---|---|---|---|
| 2006/0095336 A1 | 5/2006 | Heckerman et al. | |
| 2008/0034386 A1* | 2/2008 | Cherry | H04N 7/165 |
| | | | 725/35 |
| 2008/0306819 A1 | 12/2008 | Berkhin et al. | |
| 2009/0217326 A1* | 8/2009 | Hasek | H04N 7/17336 |
| | | | 725/87 |
| 2010/0251289 A1 | 9/2010 | Agarwal et al. | |
| 2010/0293050 A1 | 11/2010 | Maher et al. | |
| 2011/0087509 A1 | 4/2011 | Schepers et al. | |
| 2011/0321084 A1* | 12/2011 | Takahashi | H04N 5/23293 |
| | | | 725/32 |
| 2012/0030034 A1 | 2/2012 | Knapp et al. | |
| 2014/0089988 A1* | 3/2014 | Farb | H04N 21/478 |
| | | | 725/60 |
| 2014/0366057 A1* | 12/2014 | Brockmann | H04N 21/482 |
| | | | 725/37 |
| 2015/0237383 A1* | 8/2015 | Riedl | H04N 21/2385 |
| | | | 725/35 |

FOREIGN PATENT DOCUMENTS

| | | |
|---|---|---|
| KR | 10-1314430 | 9/2013 |
| WO | WO2010117605 | 10/2010 |

OTHER PUBLICATIONS

Naldi et al "The value of location in keyword auctions" https://docs.google.com/file/d/0B-tCfJjwUCRcejJtU18wUkZ3d00/edit?usp=drive_web Electronic commerce research and applicationspp. pp. 160-170; 2010.

Le Souarnec Etal "Cache policies for cloud based systems: to keep or not to keep" Submission to Infocom Apr. 24, 2014; pp. 1-8.

LaHaie "An Analysis of Alternative Slot Auction Designs for Sponsored Search Categories and Subject Descriptors," in ACM EC'06, Jun. 11-15, 2006; pp. 1-10.

Search Report dated Mar. 25, 2015.

\* cited by examiner

METHOD FOR SELECTING FROM A PLURALITY OF CANDIDATE VIDEO FRAME SETS, A CANDIDATE VIDEO FRAME SET TO BE INSERTED IN A VIDEO FRAME SLOT OF A GIVEN VIDEO CONTENT, CORRESPONDING DEVICE, ARRANGEMENT AND COMPUTER PROGRAM PRODUCT

This application claims the benefit, under 35 U.S.C. § 119 of European Patent Application No. 14306688.4, filed Oct. 23, 2014.

1. TECHNICAL FIELD

The present disclosure relates to the mitigation of data processing in a data processing system. More specifically, the disclosure relates to the management of data processing for determining a strategy of data processing in a computerized system.

2. TECHNICAL BACKGROUND

For delivery of audio/video content to consumers, it is possible to provide personalized audio/video content that is adapted to a user profile or to a profile of a set of users. Typically, a personalized audio/video content comprises base video content, which is the same for a group of users, for example a video corresponding to a movie, and content which is specific to a user or a smaller group of users and which is added when the personalized video content is processed for transmission. The specific content is typically a video frame set. The video frame set may for example be information adapted to a center of interest of a specific user or group of user. The user profile is for example obtained from a database or obtained from one or more data accessing device(s). Providing personalized video content implies taking into account a plurality of aspects such as interests of the user: what activities are appreciated by a user, what does the user like to watch, to buy, etc. When the interests of a given user are similar to the interests of an important number of other users, providing personalized content is easier to scale, as the personalized content may be built once and stored e.g. in cache memory and there is no further need to rebuild personalized content for the given user and the other users as it is sufficient to extract it from the cache location and transmit it to the users.

As it has become easier to acquire more detailed user profile data, there is a possibility to increase the granularity with which personalized audio/video content is adapted to users. This improved adaptation leads however to lesser advantages of caching prebuilt contents and scaling is difficult. For example, when the accessing device comprises an Internet browsing function, cookies are stored in the accessing device by the various sites visited by the user. These cookies comprise information on the user and can be used for building a detailed user profile of the user's interests. Consequently, the probability that many users share the same interests decreases with the precision of the profile.

Consequently, when the interest of a user does not correspond to a cached personalized video content, a content provider has two solutions: building a personalized video content adapted to each user, which is expensive in terms of processing and energy cost, or proposing a default cached content to the users, with the risk that it is not well adapted to the user's domain of interest.

The previous problem is increased when competitors compete for product placement in video frame sets that comprise advertisement placeholders. The competition between companies for obtaining the right to place their advertisement is hard and the situation may change very quickly. This means that at a given moment a first company may have the right to place an advertisement in a given placeholder while one minute later the location of the advertisement can be sold to another company that is offering more.

In cloud computing environments, the price of processing resources and storage resources is highly variable as it depends on scalability, offer/demand and energy cost. Resource cost may thus change with a high frequency based on these parameters.

In such a highly dynamic environment, it is difficult for a content provider to manage take optimized decisions whether to store or recompute personalized content.

3. SUMMARY

The present disclosure aims at alleviating some of the inconveniences of prior techniques.

More specifically, the present disclosure relates to a method for selecting from a plurality of candidate video frame sets, a candidate video frame set to be inserted in a video frame slot of a given video content, the method being implemented by a device. The method comprises selecting, from said plurality of candidate video frame sets, a list of candidate video frame sets according to ranking values of a sorting parameter associated with each of said plurality of candidate video frame sets; for each candidate video frame set in said list, applying, to said sorting parameter, a penalty corresponding to an amount of processing resources required for inserting said candidate video frame set, thereby obtaining an updated candidate video frame set ranking value according to said sorting parameter; sorting said plurality of candidate video frame sets in said list according to said updated ranking values of said sorting parameter, thereby obtaining a sorted list; and selecting a candidate video frame set from said sorted list, referred to as selected candidate video frame set, according to said updated ranking value.

According to a variant embodiment, the method comprises determining a an amount of caching resources for caching a video chunk in which the candidate video frame set has been inserted previously and applying to the sorting parameter a penalty corresponding to the amount of caching resources for obtaining an updated candidate video frame set ranking value according to the sorting parameter.

According to a variant embodiment, the candidate video frame sets are video chunks of the given video content.

According to a variant embodiment, the video chunks are targeted advertisements.

The present principles also relates to a device for selecting from a plurality of candidate video frame sets, a candidate video frame set to be inserted in a video frame slot of a given video content. The device comprises a computing module, configured to select, from said plurality of candidate video frame sets, a list of candidate video frame sets according to ranking values of a sorting parameter associated with each of said candidate video frame sets; an arrangement configured to, for each candidate video frame set of said list, apply to said sorting parameter a penalty corresponding to an amount of processing resources required for inserting said candidate video frame set, thereby obtaining an updated candidate video frame set ranking value according to said sorting parameter; a sorting module configured to sort said plurality of candidate video frame sets in said list, according to said updated ranking values of said sorting parameter, thereby obtaining a sorted list; and a selecting module configured to select a candidate video frame set from said sorted list, referred to as selected candidate video frame set, according to said updated ranking value.

According to a variant embodiment of the device, the device comprises a an arrangement configured to determine an amount of caching resources for caching a video chunk in which said candidate video frame set has been inserted previously; and apply to said sorting parameter a penalty corresponding to said amount of caching resources for obtaining an updated candidate video frame set ranking value according to said sorting parameter.

According to a variant embodiment of the device, the candidate video frame sets are video chunks of the given video content.

According to a variant embodiment of the device, the video chunks are targeted advertisements.

The present principles also relate to a computer program product downloadable from a communications network and/or stored in a computer-readable carrier and/or executable by a microprocessor, comprising program code instructions for the execution of the method for selecting, from a plurality of candidate video frame sets, a candidate video frame set to be inserted in a video frame slot of a given video content, when it is executed on a computer.

This computer program product can use any programming language, and be in the form of source code, object code or intermediate code between source code and object code, such as a partially compiled form, or in any other desirable form.

The computer-readable carrier may be any entity or device capable of storing the program. For example, the medium may comprise a storage medium, such as a ROM, for example a CD ROM or a microelectronic circuit, or a magnetic recording medium, such as a diskette (floppy disk) or a hard drive.

On the other hand, the computer-readable carrier may be a transmissible carrier such as an electrical or optical signal which may be conveyed via electrical or optical cable, by radio or by other means. The program according to the present principles may in particular be downloaded over a network such as the Internet.

Alternatively, the computer-readable carrier may be an integrated circuit in which the program is incorporated, the circuit being adapted to perform or to be used in carrying out the process in question.

According to a variant embodiment, the present principles are implemented using software and/or hardware. In this context, the term "module" can correspond in this document as well as a software component to a hardware component or a set of hardware and software components. A software component is one or more computer programs, one or more sub-programs of a program, or more generally to any element of a program or software capable to implement a function or set of functions, according to what is described below for the module. Such software component is executed by a processor of a physical entity (TV, projector, terminal, server, gateway, router, etc.) and is likely to access the hardware resources of the physical entity (memory, storage media, bus communication, e-cards I/O, user interfaces, etc.). Similarly, a hardware component is any component of a hardware (or hardware) that can implement a function or set of functions, according to what is described below for the module. It may be a component integrated with programmable hardware or software for the execution processor, for example an integrated circuit, a smart card, a memory card, an electronic card for the execution of a firmware, etc.

The various embodiments described above can be combined together for a particular advantageous implementations according to the present principles.

4. LIST OF FIGURES

The present principles are described in the following by way of examples in connection with the accompanying figures without limiting the scope of the protection as defined by the claims.

5. DETAILED DESCRIPTION

A video frame set has a processing cost which is greater or equal to zero. This processing cost is for example representative of the cost for modifying the video frame set or for inlaying the video frame set in another video (called the base video). This processing cost is used for calculating a global cost of the insertion of the video frame set regarding other gain or cost aspects of the video frame set. The video frame sets and their respective costs are processed in a list. The list is ordered regarding the global cost. The simplest way to choose a video frame set in this list is then to choose the video frame set which has the lower global cost (or the higher global gain, which is the same, when the cost is negative). Indeed, other cost (or gain) may be attached to video frame sets. Cost comprises for example storage cost or network transmission cost. Gain comprises for example a sum of money which is proposed for inserting or for processing the specific content. This may also be the time or energy which is gained for processing other content. This may also additionally be gain or cost, in terms of branding for the content provider; i.e. even if a video frame set is expensive in terms of processing cost, a content provider may choose this video frame set because it increases its own brand value and image.

The various video frame sets cost/gain information is then inserted in a data structure along with an identification of the video frame sets. An overall cost is calculated, which is basically the sum of the costs and the gains, and the video frame set with the highest resulting value is chosen.

In other words, the video frame set insertion expected cost (the processing cost) is computed for a list of candidate video frame sets, and the expected processing cost is deduced from/added to the overall cost (or gain) to select a candidate.

The content provider may then apply specific billing options for the processing of content. For example a second price rule may apply, meaning that an owner of the selected video frame set will be charged the price proposed by an owner of the video frame set that is not selected and that is ranked just below him. According to variant embodiments the owner of the selected video frame set will be charged the minimum price he could have paid to ensure that its video frame set would have been selected.

Figure 1:
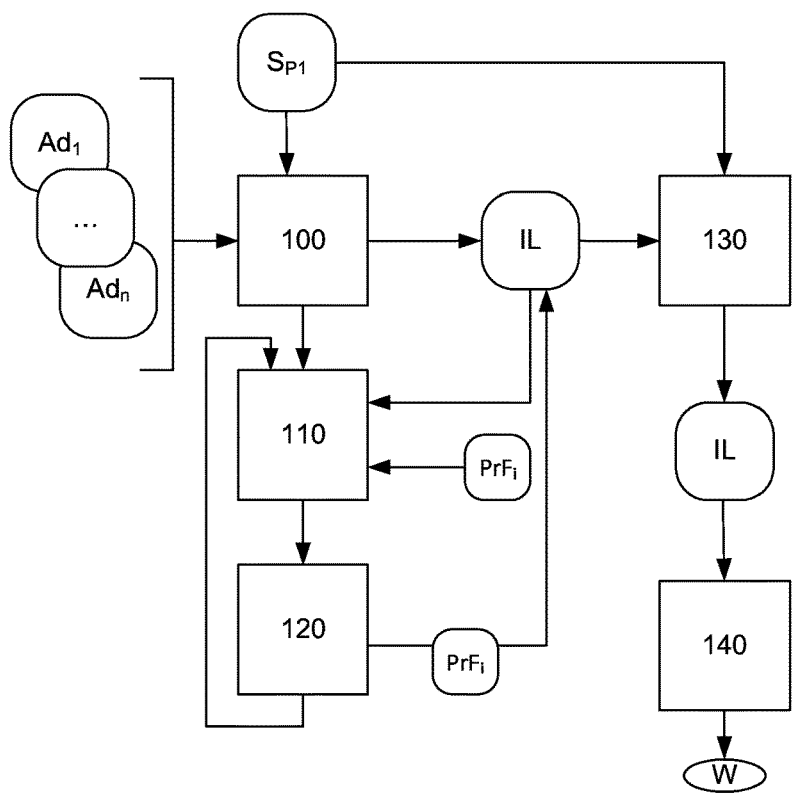
FIG. 1 is an embodiment of a method for selecting a candidate video frame set according to the present principles.

FIG. 1 is an embodiment of a method for selecting a candidate video frame set according to the present principles. The present principles comprise a method for selecting from a plurality of candidate video frame sets (Ad$_1$, . . . , Ad$_n$), a candidate video frame set (Ad$_x$) to be inserted in a video frame slot of a given video content (VC). The method comprises:

selecting (100), from the plurality of candidate video frame sets (Ad$_1$, . . . , Ad$_n$) a list (IL) of candidate video frame sets according to ranking values of a sorting parameter (S$_{p1}$) associated with each of the candidate video frame sets (Ad$_1$, . . . , Ad$_n$);

for each candidate video frame set (Ad$_i$) in the list, applying (120) to the sorting parameter, a penalty corresponding to an amount of processing resources required for inserting the candidate video frame set, thereby obtaining an updated candidate video frame set ranking value according to the sorting parameter;

sorting (130) the plurality of candidate video frame sets in the list (IL) according to the updated ranking values of the sorting parameter, thereby obtaining a sorted list;

selecting (140) a candidate video frame set of the sorted list, referred to as selected candidate video frame set (W), according to the updated ranking value.

An aspect of the present principles is related to the processing cost and the storage cost of the specific video frame sets in a cache module or device. In a content providing system, e.g. a web platform or a video streaming platform, a user requests content. Users transmit request to a video platform. The user arrival rate λ on the video platform follows a Poisson process; popularity of "base" video content (i.e. the video in which to insert content), for example movies, follows a Zipf distribution of exponent s$_m$ over N$_m$ movies; popularity of inserted content follows a Zipf distribution of exponent s$_a$ over N$_a$ inserted content. s$_m$, N$_m$, and s$_a$, N$_a$ denote the Zipf distribution parameters for movies and inserted content respectively.

One can assume that the cost for computing an item(i,j) (i.e. inlay video frame set j with base video content i) is C and that the cost for storing it over time is S. It can be shown that the expected cost follows equation (15)

$$\mathbb{E}[X] = \sum_{i=1}^{N_m} \sum_{j=1}^{N_a} p_{i,j} \left( 1_{\lambda_{i,j} \geq \frac{S}{C}} \cdot \frac{S}{\lambda_{i,j}} + 1_{\lambda_{i,j} < \frac{S}{C}} \cdot C \right) \quad (15)$$

$$\lambda_{i,j} = \lambda \cdot p_{i,j} \quad (8)$$

$$p_{i,j} = \frac{1}{i^{s_m} H_{N_m, s_m}} \frac{1}{j^{s_a} H_{N_a, s_a}} \quad (7)$$

Where $$H_{N,s} = \sum_{i=1}^{N} \frac{1}{i^s}$$

is the generalized Harmonic number.

It is also possible to compute a chunk arrival rate as $\lambda_{i,j}$ (see equation (8)). (The chunk is a piece of base video content, in which a video frame set is to be inserted). Basically for a given item (i,j) (base video content=i, video frame set=j), from the distribution, one can compute the arrival rate $\lambda_{i,j}$, and compare it to the S/C ratio to determine whether the optimal cache policy would maintain it in the cache or whether the cache policy would suggest to drop it from the cache.

From equation (15), for each targeted chunk, the expected cost (being the cost for providing the targeted chunk) can be computed, depending on its arrival rate.

If $\lambda_{i,j}$>S/C, then the expected cost is E(X)=S/($\lambda_{i,j}$);
If $\lambda_{i,j}$<S/C, then the expected cost is E(X)=C;

Of course, the previous example of computing the processing cost and storage cost is an example embodiment. In function of constraints of the content provider system, this computing can be done in another manner.

In this specific embodiment, the present principles are implemented in a Video on Demand (VoD) delivery system where advertisement graphics are inlayed in pixel zones of video frames of on-demand videos. The system relies on a cloud infrastructure. The personalized video chunks, containing inlayed video frame sets, are either computed on the fly for a given user using cloud computing resources, or, if the chunks are available in a cloud storage cache, retrieved from that cache. The cloud storage cache contains personalized video chunks that have been previously computed for other users. In this embodiment, the present principles are implemented for computing which proposal, among a plurality of proposals, is the best candidate for personalized video frame set inlaying. In this embodiment, each candidate video frame set of the plurality of candidate video frame sets comes with a financial proposal. According to the present principles this is automatic. Thus in this particular embodiment, the automatic online video advertising system where advertisements are inlayed in the video in a targeted manner can be compared to a sponsored search system, with differences however: in sponsored search, banners or images are relatively inexpensive to generate. This is lesser so for inlaying advertisements in a video, which requires decoding selected frames of the base video, inlaying personalized content (e.g. advertisements) in pixel regions of the selected video frames of the base video and re-encoding the selected frames of the video. Thus, it is important to care about the cost of the video frame sets to inlay to prevent huge consumption of processing means (and loss of revenue) for the personalized video content provider. In this specific embodiment, the sorting parameter (S$_{p1}$) is the financial proposal for inserting the video frame set in the video content. Thus the ranking value is the price offered along with the candidate video frame set. The processing cost and additionally the caching cost are determined as explained previously.

From the above, and more specifically from the computed costs related to processing and caching, several strategies can be derived for determining processing cost and for ranking the candidate video frame sets. Intuitively, the expected cost (as computed above) should be subtracted from the proposal prior ranking for selecting the video frame sets to be inlayed (this corresponds to strategy NP_C3 herein presented).

Simpler and more efficient strategies exist as will be exposed. The embodiments described in this disclosure are based on a nominal policy (referred as NP). According to the NP policy, candidate video frame sets are ranked according to their merchant value (the proposal). Highest proposal is selected for performing the video frame set insertion and the second highest proposal is used for pricing/charging. This nominal policy is source of error since the processing cost of the video frame set associated with the proposal is not accounted for. Thus, the following strategies are derived, according to the method described herein:

NP_C1: proposals are penalized by the processing cost before ranking, then NP applies. More formally, two lists of ranked proposals are considered: "ranked_proposals" and "ranked_penalized" proposals. Proposals corresponding to items not yet in the cache are penalized by the processing cost of the item (b:=b-C), and inserted in "ranked_penalized" proposals list; proposals corresponding to items already in the cache are left unpenalized, and inserted unchanged in "ranked_penalized" proposals. Then NP applies on "ranked_penalized" proposals list: highest "penalized" proposal is selected, but the "ranked_proposals" list is used for selecting the price (next highest proposal is used to charge the selected highest penalized proposal).

NP_C3: proposals are penalized by the expected cloud cost before ranking, then normal NP applies. More formally, two lists of ranked proposals are considered: "ranked_proposals" and "ranked_penalized" proposals. For each item, its arrival rate λ is computed (see equations 7 and 8) and its proposal is penalized as follow:

If $\lambda_{i,j} > S/C$, then the expected cost is $E(X) = S/(\lambda_{i,j})$
If $\lambda_{i,j} < S/C$, then the expected cost is $E(X) = C$.

The penalized proposals are stored in "ranked_penalized" proposals. Then NP applies on "ranked penalized" proposals: highest penalized proposal is selected, but the "ranked_proposals" list is used for selecting the price (next highest proposal is used to charge the selected highest penalized proposal).

Of course, the use of two lists is not necessary: a single list can also be used where a specific marking is done for penalized proposals, as previously presented in the principles of the disclosure. Furthermore, even if the term "list" is used, it is understood that, in a broader interpretation, a data structure (for example an XML file or a Database) can be use with the advantages of such data structure: the possibility of sorting on various fields of the data structure as a function of various needs.

Based on the previous strategies (NP_C1 and NP_C3), two other strategies are considered according to the present principles. NPP_C1 and NPP_C3 are similar to NP_C1 and NP_C3 respectively, except that the "penalized proposals" list is used also for pricing: the next highest proposal from the penalized proposal list is used to compute the price (after having unpenalized the proposal, to retrieve the original proposal). In other words, the price to pay is what the holder of the proposal should at least have paid to win.

The NP_Cx policy uses the NP approach for the pricing, i.e. use the initial proposal list to select the next highest proposal, while the NPP_Cx policy uses the penalized proposal list to select the next highest proposal (and then unpenalize the proposal).

In summary the C1 (NP or NPP) policy corresponds to a practical approach, where the only thing required to apply the penalty is to check the presence of the item in the cache, and to know the cost to compute a single item if not in cache. The C3 (NP or NPP) policy is a more theoretical approach where analytic expressions of the expected mean costs are taken into account. It may therefore be less obvious to implement in practice, but may be closer to the reality of the costs.

Figure 2:
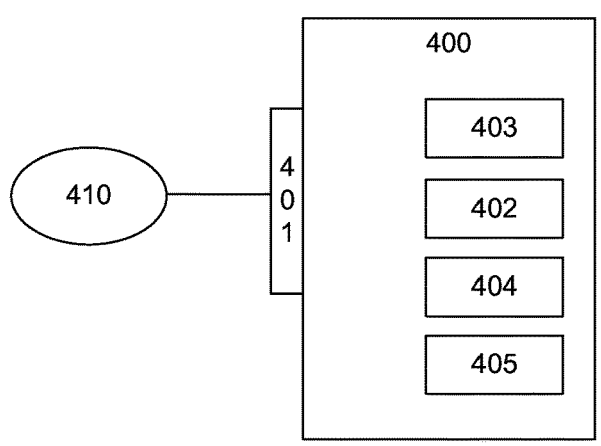
FIG. 2 is a structure of an example device for selecting a candidate video frame set according to the present principles.

FIG. 2 is an example embodiment of a device for selecting video frame sets in a personalized video provider system according to the present principles. The device (400) comprises a network interface (401) connecting the device to a network (410), e.g. for obtaining video frame set candidates (not shown), and for obtaining cost and gain associated with each candidate; a sorting unit (403) for sorting lists of video frame set candidates according to sorting parameters; a computing unit (402) for applying processing cost and/or caching cost; a determining unit (404) for determining processing cost and caching cost; possibly, the device comprise a billing unit (405) for calculating the price that should be charge to the owner of the selected video frame set candidate.

As will be appreciated by one skilled in the art, aspects of the present principles can be embodied as a system, method or computer readable medium. Accordingly, aspects of the present principles can take the form of an entirely hardware embodiment, an entirely software embodiment (including firmware, resident software, micro-code and so forth), or an embodiment combining hardware and software aspects that can all generally be defined to herein as a "circuit", "module" or "system". Furthermore, aspects of the present principles can take the form of a computer readable storage medium. Any combination of one or more computer readable storage medium(s) can be utilized.

Thus, for example, it will be appreciated by those skilled in the art that the diagrams presented herein represent conceptual views of illustrative system components and/or circuitry embodying the principles of the present disclosure. Similarly, it will be appreciated that any flow charts, flow diagrams, state transition diagrams, pseudo code, and the like represent various processes which may be substantially represented in computer readable storage media and so executed by a computer or processor, whether or not such computer or processor is explicitly shown.

A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information there from. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The invention claimed is:

1. A method for delivery of targeted video content to a video accessing device, wherein the targeted video content contains graphics inlayed in video frame sets of said targeted video content, said method being implemented by a device and comprising:

selecting, from a plurality of candidate video frame sets for targeting video content, a list of candidate video frame sets according to a value of a sorting parameter associated with each of said plurality of candidate video frame sets;

for each candidate video frame set in said list, computing a penalized value of said sorting parameter by applying a penalty to said value of said sorting parameter, said penalty corresponding to an amount of processing resources required for computing said candidate video frame set if said candidate video frame set is not present in cache memory;

sorting said plurality of candidate video frame sets in said list according to said penalized value of said sorting parameter of each candidate video frame set in said list, thereby obtaining a sorted list;

selecting a candidate video frame set from said sorted list, referred to as selected candidate video frame set, according to said penalized value of said sorting parameter;

obtaining said selected candidate video frame set from said cache memory if said selected candidate video frame set is in said cache memory;

computing a video frame set if said selected candidate video frame set is not in said cache memory, said computing comprising decoding a video frame set of said video content, inlaying graphics in pixel zones of video frames of said video frame set, and re-encoding said decoded video frame set in which said graphics are inlayed; and delivering said video content to said accessing device as targeted video content, the targeted video content comprising said selected candidate video frame set fetched from said cache memory or said computed video frame set.

2. The method according to claim 1, wherein said candidate video frame sets are video chunks of said video content.

3. The method according to claim 2, wherein said video chunks comprise targeted advertisements inlayed in pixel zones of video frames of said video content.

4. A device for delivery of targeted video content to a video accessing device, wherein said device comprises circuitry, a memory and a network interface configured to:

connect to a network for obtaining a plurality of candidate video frame sets;

select, from said plurality of candidate video frame sets for targeting video content, a list of candidate video frame sets according to a value of a sorting parameter associated with each of said candidate video frame sets;

compute, for each candidate video frame set of said list, a penalized value of said sorting parameter by applying a penalty said value of said sorting parameter, said penalty corresponding to an amount of processing resources required for inserting said candidate video frame if said candidate video frame is not present in cache memory;

sort said plurality of candidate video frame sets in said list according to said penalized value of said sorting parameter of each candidate video frame set in said list, thereby obtaining a sorted list;

select a candidate video frame set from said sorted list, referred to as selected candidate video frame set, according to said penalized value of said sorting parameter;

obtain said selected candidate video frame set from said cache memory if said selected candidate video frame set is in said cache memory;

compute a video frame set if said selected candidate video frame set is not in said cache memory, said computing comprising decoding a video frame set of said video content, inlaying graphics in pixel zones of video frames of said video frame set, and re-encoding said decoded video frame set in which said graphics are inlayed; and deliver said video content to said accessing device as targeted video content, the targeted video content comprising said selected candidate video frame set fetched from said cache memory or said computed video frame set.

5. The device according to claim 4, wherein said candidate video frame sets are video chunks of said video content.

6. The device according to claim 5, wherein said video chunks comprise targeted advertisements inlayed in pixel zones of video frames of said video content.

7. A non-transitory computer readable storage medium, comprising program code instructions for the execution of a method for delivery of targeted video content to a video accessing device, wherein the program code instructions when executed comprise:

selecting, from a plurality of candidate video frame sets for targeting video content, a list of candidate video frame sets according to a value of a sorting parameter associated with each of said plurality of candidate video frame sets;

for each candidate video frame set in said list, computing a penalized value of said sorting parameter by applying a penalty to said value of said sorting parameter, said penalty corresponding to an amount of processing resources required for computing said candidate video frame set if said candidate video frame set is not present in a cache memory;

sorting said plurality of candidate video frame sets in said list according to said penalized value of said sorting parameter of each candidate video frame set in said list, thereby obtaining a sorted list;

selecting a candidate video frame set from said sorted list, referred to as selected candidate video frame set, according to said penalized value of said sorting parameter;

obtaining said selected candidate video frame set from said cache memory if said selected candidate video frame is in said cache memory;

computing a video frame set if said selected candidate video frame set is not in said cache memory, said computing comprising decoding a video frame set of said video content, inlaying graphics in pixel zones of video frames of said video frame set, and re-encoding said decoded video frame set in which said graphics are inlayed; and delivering said video content to said accessing device as targeted video content, the targeted video content comprising said selected candidate video frame set fetched from said cache memory or said computed video frame set.

* * * * *